H. E. SMITH.

Improvement in Churns.

No. 130,322.

Patented Aug. 6, 1872.

Witnesses.
Ernst Bilhuber
C. Wahlers

Inventor.
Hamilton E. Smith

UNITED STATES PATENT OFFICE.

HAMILTON E. SMITH, OF NEW YORK, N. Y.

IMPROVEMENT IN CHURNS.

Specification forming part of Letters Patent No. 130,322, dated August 6, 1872.

*To all whom it may concern:*

Be it known that I, HAMILTON E. SMITH, of New York, in the county of New York and State of New York, have invented a new and useful Improvement in Churns; and I do hereby declare the following to be a full, clear, and exact description thereof, which will enable those skilled in the art to make and use the same, reference being had to the accompanying drawing forming part of this specification, in which drawing—

Figure 1:
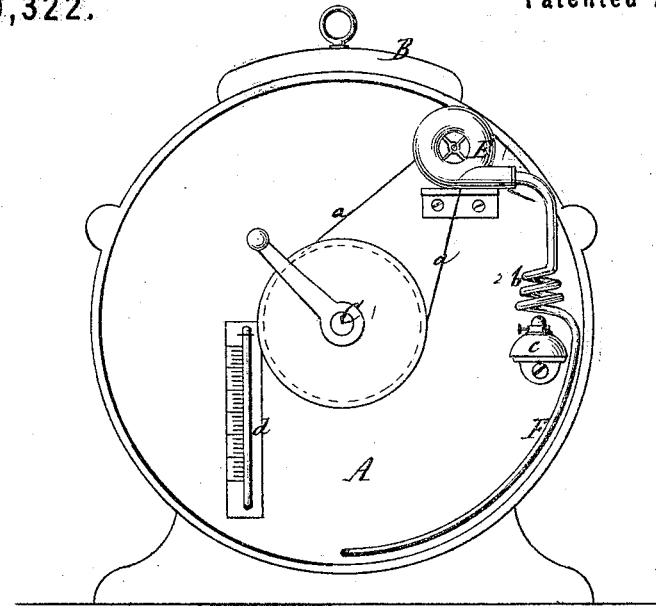
Figure 2:
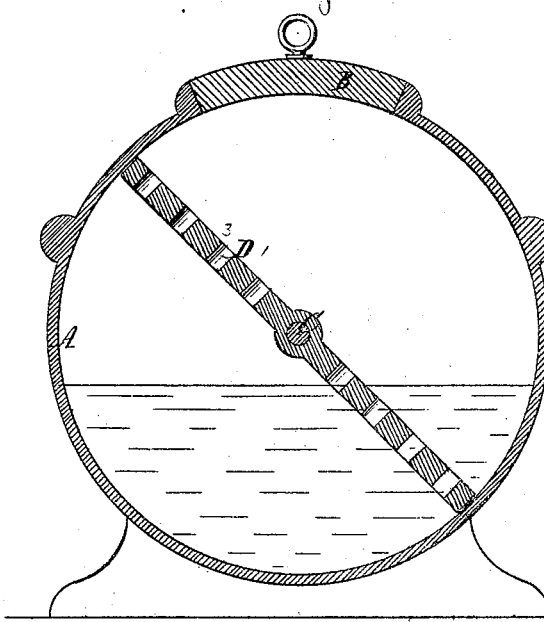

Figure 1 represents an end view of my churn. Fig. 2 is a transverse section of the same.

Similar letters indicate corresponding parts.

This invention relates to churns composed of a cylindrical tub, which contains a perforated gathering-dasher extending from the shaft clear to the inner surface of the tub, in combination with a fan-blower, which serves to inject a current of air into the tub in such a manner that, by the agitation of the air driven into the churn, the butter is formed and separated, and by the gathering-dasher the butter is collected in two rolls, one on each end of said dasher. The pipe which carries the air from the fan-blower in the tub is provided with a coil that is exposed to the flame of a lamp, so that the air, while passing through said coil, can be heated to the temperature most advantageous for churning.

In the drawing, the letter A designates a tub made in the form of a cylinder, which is placed in a horizontal position and provided with an aperture, through which access can be had to its interior, and which can be firmly closed by a suitable door or cover, B. Through the center of this tub extends a shaft, C, to which a revolving motion can be imparted by hand, foot, or any other power, and on this shaft is firmly mounted a dasher, D, which is perforated with a large number of holes, and extends from both sides of the shaft clear to the inner surface of the cylinder. This dasher does not act as an agitator, like an ordinary dasher, but it acts chiefly as a gatherer or collecting device, since by its action the butter formed in the tub is collected in two rolls, one on each end of said dasher. The agitation of the cream in my churn is chiefly effected by the action of a current of air, which is injected in the cream by means of a fan-blower, E, and a pipe, F. The fan-blower is by preference secured to the end of the tub A, (see Fig. 1,) and it is driven by a belt, *a*, extending from a pulley mounted on the shaft C over a pulley on the blower-shaft; but it must be remarked that other air-forcing devices might be substituted for the fan-blower. The pipe F extends from the spout of the fan-blower, and in this pipe is formed a coil, *b*, which is exposed to the flame of a lamp, *c*, or to any other heating device, so that the air on its passage from the air-forcing apparatus to the tub is heated to the desired temperature, which is determined by a thermometer, *d*, secured in one of the heads of the tub.

By the action of the air injected into the tub and through the cream the butter is rapidly formed or separated, and the butter thus separated is collected by the gathering-dasher D, and by heating the air driven into the tub the operation is materially facilitated.

What I claim as new, and desire to secure by Letters Patent, is—

1. The fan-blower E driven from the central shaft C, which carries a gathering-dasher, D, said fan-blower being connected with the tub A by a pipe, F, all constructed and operating substantially in the manner shown and described.

2. The coil *b* in the pipe F, in combination with a lamp or other heating device, whereby the air driven by the blower into the tub is heated, substantially as set forth.

3. The gathering-dasher D, extending diametrically across the tub and close to its inner circumference, thus dividing the tub in two distinct compartments, substantially as described.

This specification signed by me this 22d day of January, 1872.

HAMILTON E. SMITH.

Witnesses:
W. HAUFF,
E. F. KASTENHUBER.